Jan. 26, 1965 G. R. GAMERTSFELDER 3,167,606

APPARATUS FOR ELIMINATING CORRELATION INTERFERENCE

Filed Aug. 8, 1962 3 Sheets-Sheet 1

INVENTOR.
G.R. GAMERTSFELDER
BY H. A. Mackey
ATTORNEY

APPARATUS FOR ELIMINATING CORRELATION INTERFERENCE

Filed Aug. 8, 1962 3 Sheets-Sheet 2

*INVENTOR.*
G.R. GAMERTSFELDER
*BY* [signature]
ATTORNEY

INVENTOR.
G.R. GAMERTSFELDER

BY

ATTORNEY

United States Patent Office 3,167,606
Patented Jan. 26, 1965

3,167,606

APPARATUS FOR ELIMINATING CORRELATION INTERFERENCE

George R. Gamertsfelder, Pleasantville, N.Y., assignor to General Precision, Inc., a corporation of Delaware Filed Aug. 8, 1962, Ser. No. 215,569
8 Claims. (Cl. 88—14)

This invention relates to apparatus for measuring the correlation in position between two objects and for eliminating background and interference.

By correlation in position is meant the matching of two identical or similar objects to find that position of one with respect to the other in which they are geometrically homologous, or most nearly homologus. As a one-dimensional correlation example, two strips are taken which have variations along the lengthwise dimension. These variations are similar, if not identical. One of these strips is slid along the other to the position in which they most nearly match. This is the position of maximum correlation.

When two objects, such as two strips, are infinite in length, the position of maximum correlation cannot be confused with any other position, but when the strips have finite length it is possible in some situations to find positions of spurious match which effectively mask the position of maximum correlation. This may be characterized as interference due to dimensional limitation.

Let the two strips be represented by mathematical functions $F(x)$ and $G(x)$. That is, $G(x)$ is some physical quantity, for example optical transmittance, expressed as a function of a coordinate dimension $x$. It is limited in extent to the region between $x=a$ and $x=b$. Similarly $F(x)$ represents the same physical quanity as a function of $x$ for the second strip, but is not confined to the same limited region as $G(x)$. It is desired to find what relative displacement of $F(x)$ causes it to most closley match $G(x)$ in the region between $x=a$ and $x=b$. The function $F(x)$ when displaced in the $x$ direction by an amount $\Delta$ can be represented by the function $F(x-\Delta)$. The quality of the match between the two functions is frequently expressed by the correlation function, which is a function of the relative displacement $\Delta$, and which by definition is the average value of the product $G(x)\ F(x-\Delta)$ over the interval from $x=a$ to $x=b$. That is $$\psi(\Delta)=\overline{G(x)F(x-\Delta)}^{\,a\qquad b} \qquad (1)$$

where $\psi(\Delta)$ is the correlation function and the overbar with indices $a$, $b$ represents an average taken over the interval $x=a$ to $x=b$.

When the function $F_1(x)$ is stationary, that is, of such a nature that all samples of length $b-a$ are statistically equivalent, the correlation function will exhibit a well defined peak at the value of $\Delta$ for which the two functions $G(x)$ and $F(x-\Delta)$ are most nearly matched. However, for a short enough interval $b-a$, any function becomes effectively non-stationary and the shape of the correlation function $\psi(\Delta)$ as defined above is profoundly influenced by changes in the average value of $F_1(x-\Delta)$ taken over the interval from $x=a$ to $x=b$. In particular, there will be a strong tendency for $\psi(\Delta)$ to have its maximum at a value of $\Delta$ for which $$\overline{F(x-\Delta)}^{\,b\qquad a}$$

is a maximum, thus obscuring the indication of match. This may be termed interference due to dimensional limitation.

It has been discovered that these regions of false correlation may be suppressed so that the true correlation maximum is revealed by a process which mathematically is described as:

Creating a third quantity equal to the average of $G(x)$, here termed $\overline{G}$;

setting up a relation denoted by $$\Gamma(\Delta)=\overline{\overline{G}F(x-\Delta)}^{\,a\qquad b}=\overline{G}\,\overline{F(x-\Delta)}^{\,a\qquad b} \qquad (2)$$

and subtracting (2) from (1), or $$\phi(\Delta)=\psi(\Delta)-\Gamma(\Delta) \qquad (3)$$

The resulting difference, $\phi(\Delta)$, is a function from which all of the masking elements have been removed, so that any correlation maximum which exists is truly representative of the best match.

Correlation procedures may be employed to establish identity, for example, in comparing the spectrum of an unknown chemical substance with the known spectrum of a chemical element. Put more generally, correlation may be used to compare a short, limited random function of a single independent variable with a long, limited random function of the same variable when there is an identity or similarity between the former and a section of the latter.

As an example of the operation of the above principles in a simple one-dimensional case assume that the spectrum of a chemical element, the identity of which is unknown, is represented on a short strip of transparent film by transverse opaque lines. The spectra of several elements, one of which is the unknown element, are represented in a series on another, longer strip of film. This film represents the expression $F(x-\Delta)$ and the short transparency of the unknown element represents the expression $G(x)$. These transparencies, or more properly the expressions represented thereby, are in effect multiplied by inserting them in a projector, one superimposed on the other or separated by a short distance, illuminated with parallel light, the light collected by a lens system and focused to a point on a detector. The detector output is applied to operate the pen of a curve-drawing instrument. A motor advances the curve-drawing instrument and also advances the longer strip of film in the projector.

When the short transparency pattern comes into exact correlation with a section of the long pattern, the detector response will be at a maximum and the curve drawn will show a peak, indicating that the two spectra being correlated are identical and represent the same element. However, other parts of the long film will produce detector peaks which, indeed, may be higher than the correlation peak looked for.

Accordingly, a third short transparency is prepared having the same number of lines as the short transparency representing the term $G(x)$. These lines, however, are equally spaced so that the average of light transmission is the same in both. The transparency represents the term $\overline{G}$.

A second apparatus similar to the first is constructed substituting the evenly spaced transparency for the unknown transparency. The curve drawn by this apparatus has no correlation peak but will have a general similarity of shape to the first curve. If now the second curve be subtracted from the first, the difference curve will contain the correlation peak and little else. This subtraction can be done manually by comparing the curves, electrically by subtracting detector outputs, or optically by employing a photographic negative of the long transparency in the second apparatus and then employing a single detector to receive the condensed light from both apparatuses.

The interference due to dimension limitation is thus eliminated when the samples are single-dimensional. Similar practical procedures can be employed to compare two-dimensional objects.

The purpose of this invention is to provide an instrument for discovering the correlation between two objects in the presence of masking interference due to limited sizes of the objects.

A further understanding of this invention may be secured from the following detailed description and associated drawings, in which.

Figure 1:
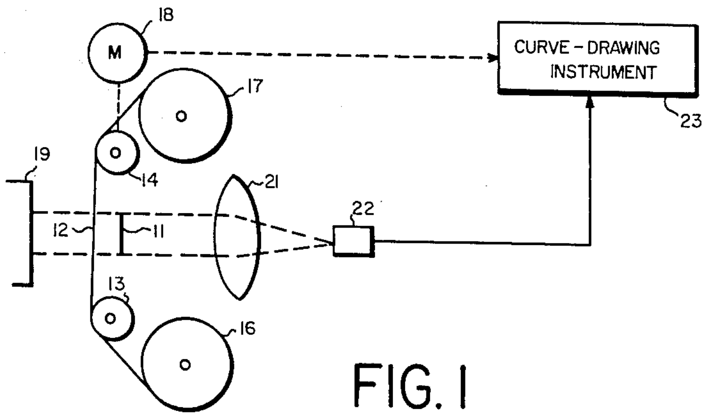
FIGURE 1 is a diagrammatic illustration of an apparatus used for detecting one-dimensional correlation.
Figure 2:
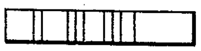
FIGURE 2 depicts a short transparency of the spectrum of an unknown chemical substance.

Referring now to FIGURE 1, a positive transparency 11 of a chemical element spectrum the identity of which is sought is composed of transverse opaque lines on a short strip of transparent film, as shown in FIGURE 2. A second positive transparency 12, FIGURE 1, is much longer and carries a number of chemical element spectra in succession, each consisting of opaque lines on transparent film. Each spectrum representation is to the same scale as that of the spectrum 11 and occupies the same length of film. The film 12 is carried on rollers 13 and 14, and is wound forward, from a drum 16 to a drum 17, by a motor 18.

The two transparencies are positioned a short distance apart in the path of a parallel light beam from a collimated light source 19. After passing through the two transparencies the light is condensed by a lens 21 to a focal point on the surface of a light intensity detector 22. The output current of this detector operates the pen of a curve-drawing instrument 23, which draws a line on a moving sheet of paper. The paper of this instrument is advanced by the motor 18.

Figure 3:
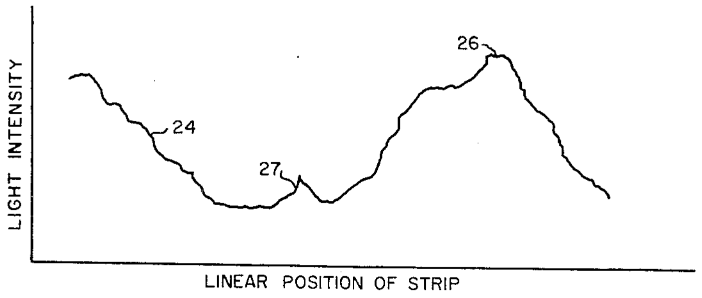
FIGURE 3 is a curve drawn by the apparatus of FIGURE 1.

As the transparent strip 12 is drawn through the light beam the curve drawn might be that shown in FIGURE 3, which exhibits light intensities, such as parts 24 and 26 of the curve, which may interfere with the correlation process by masking the true correlation peak 27 drawn at the time that a spectrum on the strip 12 exactly matching the unknown transparency 11 was pulled into place in the light beam. In this representation, the variation of density on the strip 12 represents the quantity $F(x-\Delta)$ in Equation 1 and that on strip 11 represents $G(x)$. The variation of light intensity at the detector 22 represents the quantity $\psi(\Delta)$, and the curve-drawing instrument draws a curve having $\psi(\Delta)$ as ordinate and $\Delta$ as abscissa.

Figure 4:
FIGURE 4 depicts a short transparency having the same number of lines as the spectrum of FIGURE 2, but equally spaced.
Figure 5:
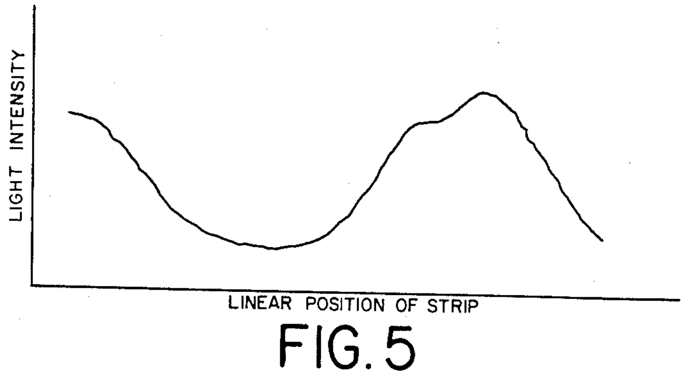
FIGURE 5 is a curve which is similar to that of FIGURE 3 except that rapid changes in shape, including the correlation peak, are absent.
Figure 6:
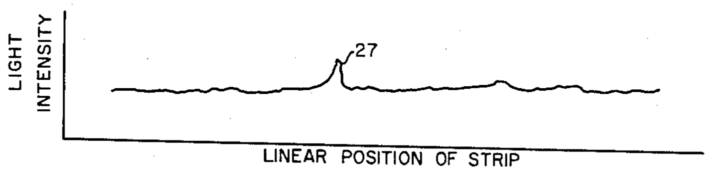
FIGURE 6 is the curve resulting from the subtraction of the curve of FIGURE 5 from the curve of FIGURE 3.

It is desired to flatten out the curve portions 24 and 26, FIGURE 3, so that the correlation peak 27 becomes the highest part of the curve. A transparency of the same size as that of FIGURE 2 is prepared having the same number of transverse lines but having them equally spaced. This transparency is prepared by counting the total number of lines in the transparency of FIGURE 2 and ruling the same number of lines on the new transparency, except that they are ruled so as to be evenly and equally spaced apart. Thus the total light transmission through this transparency is exactly the same as through the other transparency, but while the transparency of FIGURE 2 characterizes the lines of a chemical element spectrum by the line spacings and line positions representing specific wavelengths of radiation, all such meaning is absent from the equally-spaced lines of the present transparency. It may be said to lack the characteristic fine pattern of the other transparency. This new transparency represents the quantity $\overline{G}$, that is, the average value of $G(x)$. It is shown in FIGURE 4. When the transparency of FIGURE 4 is compared with the long transparency in such an apparatus as shown in FIGURE 1, the gross features of FIGURE 3 will be exhibited without the fine detail and without the correlation peak 27, and will appear as shown in FIGURE 5. The output, if subtracted from the output shown in FIGURE 3, results in a difference curve such as shown in FIGURE 6.

Figure 7:
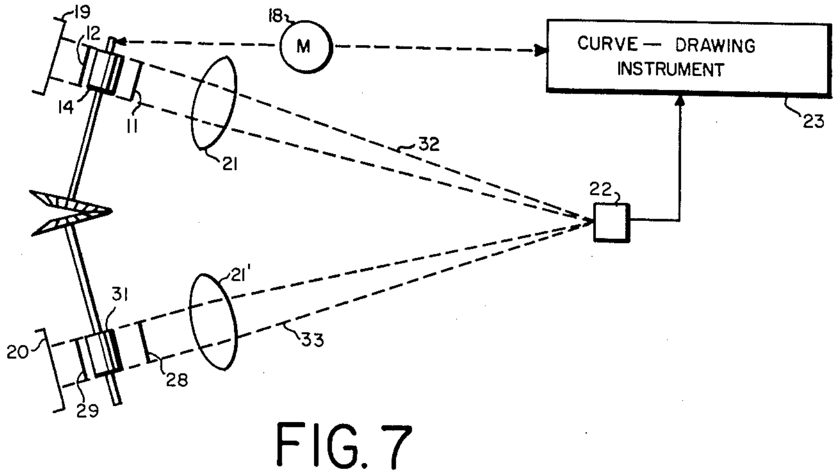
FIGURE 7 illustrates a combination of optical and electrical apparatus which generates functions depicted by the curves of FIGURES 3 and 5, subtracts them optically, and draws a curve similar to the difference curve of FIGURE 6.

The inventive combination is shown in FIGURE 7, which is an elevation of the plan view of FIGURE 1 with the subtrahend and difference components added. The transparencies 11 and 12, and associated parts, are the same as in FIGURE 1 and operate similarly. The reference transparency 28 is that shown in FIGURE 4 and represents the function $\overline{G}$. The transparency 29 is a photographic negative of the transparency 12 and the function represented is therefore $$1-F(x-\Delta)\equiv J(x-\Delta) \quad (4)$$

Each of the pairs of transparencies is illuminated by a parallel light beam from the sources 19 and 20. The films 12 and 29 are driven at the same speed and in synchronism by the driving rollers 14 and 31.

In operation, the beam 32 applies light varying as shown in FIGURE 3 to the detector 22, while beam 33 applies a light amplitude which is the inverse of the curve of FIGURE 5 to the detector. Therefore, during the parts of the curve 24 and 26, FIGURE 3, a horizontal line at average intensity is drawn, with the fine variations of FIGURE 3 superimposed including the correlation peak 27. The whole curve is thus like that of FIGURE 6, which is what is desired, with the correlation peak 27 emphasized and unmistakable. The signal subtraction, effecting the subtraction indicated in Equation 3, is accomplished optically as the two light beams impinge on the single detector, and is due in part to the use of a negative transparency 29.

Figure 8:
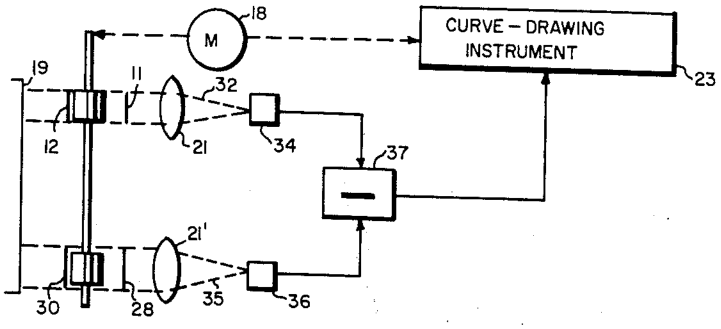
FIGURE 8 illustrates another combination for drawing a curve similar to the difference curve of FIGURE 6 but using electrical subtraction equipment.

This subtraction can be achieved by wholly electrical means in several ways, one of which is indicated in FIGURE 8. In this form of the invention the transparencies 11 and 12 generate beam 32 as before, which is focused on a detector 34. Transparency 28 is that shown in FIGURE 4 and represents the function $\overline{G}$, as before. Transparency 30 is positive and is identical with the positive transparency 12. Transparencies 28 and 30 generate a beam 35 which is focused on a detector 36. The two detector outputs are subtracted in an electrical subtracting circuit, 37, whose output has an amplitude variation depicted by the curve of FIGURE 6. This output is applied to the curve-drawing instrument 23. In this case the signal level at a point distant from the correlation peak 27 can be zero, while in the combination of FIGURE 7 optical subtraction provides an average level equal to the average intensity of the sum of the beams.

Of course, in place of a positive transparency 30 identical with 12, a negative of transparency 12 can be used as in the embodiment of FIGURE 7. The subtracting circuit 37 is then replaced by an electrical adding circuit with the same results except that the correlation peak is superimposed on a constant background having an intensity equal to the average of the positive and negative transparencies, as in FIGURE 7.

Figure 9:
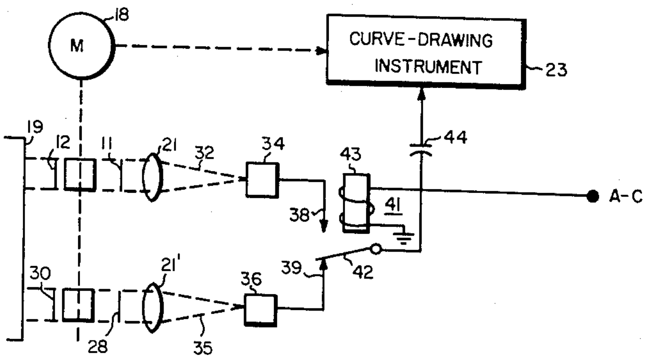
FIGURE 9 illustrates another combination for drawing a curve similar to the difference curve of FIGURE 6 but using a relay for generating the difference signal.

Another way of subtracting the two signals is illustrated in FIGURE 9. In this form of the invention the transparencies 11 and 12 generate beam 32 as before, and this beam is focused on the detector 34. Also, as before, transparencies 28 and 30 generate beam 35, which is focused on the detector 36. The outputs of the two detectors are connected to the fixed contacts 38 and 39 of a relay or chopper 41 having a contact arm 42 and a coil 43 operated from an alternating current source. The arm 42 is coupled through a capacitor 44 to the curve-drawing instrument 23 having paper advanced by the motor 18.

In the operation of the combination of FIGURE 9, any correlation peak in the beam from lens 21' is absent because of the lack of detail in the transparency 28, while the correlation peak does exist in the light from lens 21. At points far removed from correlation both light inputs to the detectors 34 and 36 are equal in intensity, but at and near the correlation peak the two light inputs differ in intensity. The relay 41 serves as an alternating current generator but only when the potentials on its fixed contacts 38 and 39 are different. Since this occurs only at and near the correlation peak, the capacitor 44 passes the current only in that region, thus reducing to zero all parts of the curve drawn by the curve-drawing instrument 23 except those parts at and near the correlation peak.

Figure 10:
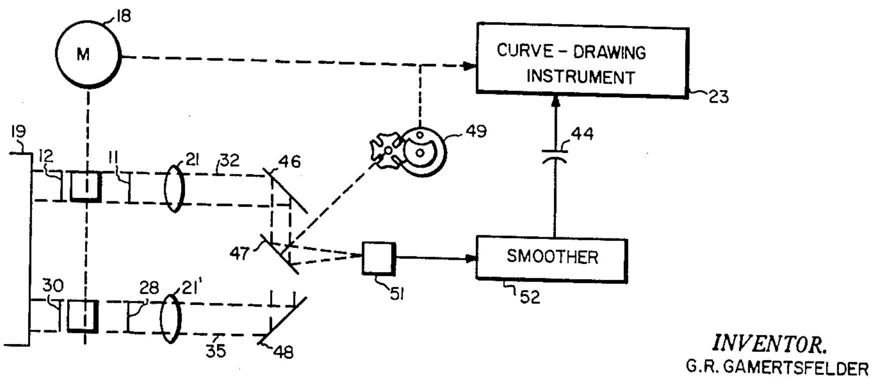
FIGURE 10 illustrates another combination for drawing a curve similar to the difference curve of FIGURE 6 but using an optical-electrical method of subtraction.

FIGURE 10 illustrates an optical-electrical method of generating the alternating current applied through the capacitor to the curve-drawing instrument. The transparencies 11, 12, 28 and 30 are the same as described in connection with FIGURES 8 and 9, and the beams 32 and 35 are generated and have the characteristics described. However, instead of impinging on two separate detectors, the two beams are both deflected and interrupted so as to impinge alternately on a single detector. The beam 32 is deflected by an oblique mirror 46 toward a moving mirror 47. The beam 35 is deflected by another oblique mirror 48 toward the same moving mirror 47. The mirror 47 is silvered on both sides and is rotated by a mechanism 49, operated by the motor 18, for converting continuous rotational motion to intermittent rotation motion. The mechanism 49 may consist, for example, of a 90° Geneva movement such as is commonly employed in motion picture cameras and projectors. Such a movement will move the mirror 47 from the 45° position shown in the figure to a position 90° therefrom, where it dwells momentarily. Motion continues, permitting the mirror to dwell intermittently at each of four positions separated by 90°. Thus the mirror 47 alternately reflects beams 32 and 35 to a detector 51.

The detector output is smoothed in a smoother 52 having such a time constant that the output is invariable in amplitude when the two beams 32 and 35 have the same optical intensity, but the output has an alternating current component when the two beam intensities are different. The smoothed output is coupled by the capacitor 44 to the curve-drawing instrument 23.

In the operation of the apparatus of FIGURE 10, the light beams 32 and 35 are alternately projected to the sensitive portion of the detector 51 at a convenient rate of alternation. When the two beams 32 and 35 are of different intensities, which occurs only at and near the correlation peak, an alternating current at the rate of alternation is generated at the detector 51. After smoothing out fortuitous higher frequency discontinuities at the smoother 52, the alternating current is coupled through the capacitor 44 to cause the curve-drawing instrument 23 to draw a curve consisting substantially only of the correlation peak.

What is claimed is:

1. An instrument for detecting and measuring correlation in position between patterns embodying functional representations in the presence of interference comprising, a first pattern embodying a first function of an independent variable, a second limited pattern embodying a second function of said variable spatially positioned with respect to said first pattern, means correlating said first and second patterns by obtaining the average of the point by point products thereof in repeatedly shifted relative positions to form a first signal representing a correlation function including interference, a third limited pattern embodying a third function of said variable equal to the average of said second function spatially positioned with respect to said first pattern, means correlating said first and third patterns by obtaining the average of the point by point products thereof in repeatedly shifted relative positions to form a second signal representing a background correlation function, and means subtracting said second signal from said first signal to form a third signal representing a correlation function free from interference.

2. An instrument for detecting and measuring correlation in position between patterns embodying functional representations in the presence of interference comprising, a first pattern embodying a first function of at least one variable, a second limited pattern embodying a second function of the same variable, means projecting a beam of radiation through both patterns to produce a first output beam, a third limited pattern embodying a third function of the same variable equal to the average of said second function, a fourth pattern representing said first pattern, means projecting a beam of radiation through said third and fourth patterns to produce a second output beam, and means receiving said first and second output beams and operated thereby to produce a signal representing the difference thereof and embodying a correlation function free from interference.

3. An instrument for detecting and measuring correlation in position between patterns embodying functional representations in the presence of interference comprising, a first pattern embodying a first function of at least one variable, a second limited pattern embodying a second function of the same said variable, means projecting a beam of radiation through both patterns to produce a first output beam, a third limited pattern embodying a third function of the same variable equal to the average of said second function, a fourth pattern constituting the negative of said first pattern and embodying a fourth function of the same variable, said fourth function being equal to unity minus said first function, means projecting a beam of radiation through said third and fourth patterns to produce a second output beam, and means receiving said first and second output beams and operated thereby to produce a signal representing the difference thereof and embodying a correlation function free from interference.

4. An instrument for detecting and measuring correlation in position between patterns embodying functional representations in the presence of interference comprising, a first pattern embodying a first function of at least one variable, a second limited pattern embodying a second function of the same variable,
means projecting a beam of radiation through both patterns to produce a first output beam,
a third limited pattern embodying a third function of the same variable equal to the average of said second function,
a fourth pattern constituting the negative of said first pattern and embodying a fourth function of the same variable, said fourth function being equal to unity minus said first function,
means projecting a beam of radiation through said third and fourth patterns to produce a second output beam,
and detector means receiving said first and second output beams and operated thereby to produce a single electrical signal representing the difference thereof and embodying a correlation function free from interference.

5. An instrument for detecting and measuring correlation in position between patterns embodying functional representations in the presence of interference comprising,
a first pattern embodying a first function of at least one variable,
a second limited pattern embodying a second function of the same variable,
means projecting a beam of radiation through both patterns to produce a first output beam,
a third limited pattern embodying a third function of the same variable equal to the average of said second function,
a fourth pattern identical with said first pattern,
means projecting a beam of radiation through said third and fourth patterns to produce a second output beam,
and means receiving said first and second beam and operated thereby to produce a signal representing the difference thereof and embodying a correlation function free from interference.

6. An instrument for detecting and measuring correlation in position between patterns embodying functional representations in the presence of interference comprising,
a first pattern embodying a first function of at least one variable,
a second limited pattern embodying a second function of the same variable,
means projecting a beam of radiation through both patterns to produce a first output beam,
a third limited pattern embodying a third function of the same variable equal to the average of said second function,
a fourth pattern identical with said first pattern,
means projecting a beam of radiation through said third and fourth patterns to produce a second output beam,
a first detector receiving said first output beam and operated thereby to produce a first electrical signal representing the amplitude thereof,
a second detector receiving said second output beam and operated thereby to produce a second electrical signal representing the amplitude thereof,
and an electrical subtracting circuit receiving said first and second electrical signals and producing a difference signal representing the difference thereof and embodying a correlation function free from interference.

7. An instrument for detecting and measuring correlation in position between patterns embodying functional representations in the presence of interference comprising,
a first pattern embodying a first function of at least one variable,
a second limited pattern embodying a second function of the same variable,
means projecting a beam of radiation through both patterns to produce a first output beam,
a third limited pattern embodying a third function of the same variable equal to the average of said second function,
a fourth pattern identical with said first pattern,
means projecting a beam of radiation through said third and fourth patterns to produce a second output beam,
a first detector receiving said first output beam and operated thereby to produce a first electrical signal representing the amplitude thereof,
a second detector receiving said second output beam and operated thereby to produce a second electrical signal representing the amplitude thereof,
an electromagnetic chopper having double-throw contacts and a contact arm,
means applying said first electrical signal to one of said double-throw contacts,
means applying said second electrical signal to the other of said double-throw contacts,
and alternating current means connected to said contact arm receiving a signal representing the difference of said first and second electrical signal and embodying a correlation function free from interference.

8. An instrument for detecting and measuring correlation in position between patterns embodying functional representations in the presence of interference comprising,
a first pattern embodying a first function of at least one variable,
a second limited pattern embodying a second function of the same variable,
means projecting a beam of radiation through both patterns to produce a first output beam,
a third limited pattern embodying a third function of the same variable equal to the average of said second function,
a fourth pattern identical with said first pattern,
means projecting a beam of radiation through said third and fourth patterns to produce a second output beam,
means directing said first beam to moving mirror means,
means directing said second beam to said moving mirror means,
a light detector having an output,
and means moving said moving mirror means to reflect said first and second beams in alternation onto said detector whereby the output thereof contains an alternating current representing the difference in intensity of said two beams and embodying a correlation function free from interference.

References Cited by the Examiner

UNITED STATES PATENTS

| | | | |
|---|---|---|---|
| 2,470,877 | 5/49 | Stuland | 88—14 |
| 2,679,636 | 5/54 | Hillyer | 88—14 |
| 2,787,188 | 4/57 | Berger | 88—14 |
| 2,927,501 | 3/60 | Busignies et al. | 88—14 |
| 2,964,642 | 12/60 | Hobrough | 88—14 X |

JEWELL H. PEDERSEN, *Primary Examiner.*